United States Patent
Chan et al.

(10) Patent No.: US 9,462,188 B2
(45) Date of Patent: Oct. 4, 2016

(54) TIME EXTENSION FOR IMAGE FRAME PROCESSING

(71) Applicant: QUALCOMM Incorporated, San Diego, CA (US)

(72) Inventors: Leung Chun Chan, San Diego, CA (US); Ying Chen Lou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 14/664,741

(22) Filed: Mar. 20, 2015

(65) Prior Publication Data

US 2016/0127628 A1 May 5, 2016

Related U.S. Application Data

(60) Provisional application No. 62/073,499, filed on Oct. 31, 2014.

(51) Int. Cl.
*H04N 5/232* (2006.01)
*H04N 5/235* (2006.01)
*H04N 5/353* (2011.01)

(52) U.S. Cl.
CPC .......... *H04N 5/2327* (2013.01); *H04N 5/2353* (2013.01); *H04N 5/23212* (2013.01); *H04N 5/23287* (2013.01); *H04N 5/353* (2013.01)

(58) Field of Classification Search
CPC ........... H04N 5/23212; H04N 5/2327; H04N 5/23287; H04N 5/2353; H04N 5/353
See application file for complete search history.

(56) References Cited

U.S. PATENT DOCUMENTS

| | | | |
|---|---|---|---|
| 5,008,698 A * | 4/1991 | Muramatsu | H04N 5/353 348/E3.019 |
| 5,335,041 A | 8/1994 | Fox | |
| 5,469,240 A | 11/1995 | Uchiyama et al. | |
| 5,594,928 A | 1/1997 | Yamano | |
| 5,625,434 A | 4/1997 | Iwane | |
| 5,751,354 A * | 5/1998 | Suzuki | H04N 5/2351 348/296 |
| 6,567,123 B1 * | 5/2003 | Hashimoto | H04N 5/217 348/223.1 |
| 8,384,820 B1 * | 2/2013 | Lohier | H04N 5/23212 348/349 |
| 2009/0109321 A1 * | 4/2009 | Takeuchi | G03B 13/36 348/345 |
| 2013/0121676 A1 | 5/2013 | Hong et al. | |
| 2013/0135491 A1 * | 5/2013 | Shimaoka | H04N 5/23229 348/222.1 |
| 2014/0176785 A1 * | 6/2014 | Sambonsugi | H04N 5/23212 348/350 |
| 2015/0097991 A1 * | 4/2015 | Nobayashi | H04N 5/23212 348/241 |

FOREIGN PATENT DOCUMENTS

WO 2007057498 A1 5/2007

OTHER PUBLICATIONS

International Search Report and Written Opinion for International Application No. PCT/US2015/054445, ISA/EPO, Date of Mailing Feb. 2, 2016, 12 pages.

* cited by examiner

*Primary Examiner* — Amy Hsu

(74) *Attorney, Agent, or Firm* — Heejong Yoo

(57) ABSTRACT

A method includes determining, at an image processor, a first time period associated with processing a first frame of an image captured via an image sensor. The method also includes extending a frame time for processing the first frame by a second time period. The second time period is based at least in part on an amount of permitted focus value contamination for processing the first frame, and the frame time includes the first time period and the second time period.

30 Claims, 7 Drawing Sheets

TIME EXTENSION FOR IMAGE FRAME PROCESSING

I. CLAIM OF PRIORITY

The present application claims priority from U.S. Provisional Patent Application No. 62/073,499 entitled "TIME EXTENSION FOR IMAGE FRAME PROCESSING," filed Oct. 31, 2014, the contents of which are incorporated by reference in their entirety.

II. FIELD

The present disclosure is generally related to image frame processing.

III. DESCRIPTION OF RELATED ART

Advances in technology have resulted in smaller and more powerful computing devices. For example, a variety of portable personal computing devices, including wireless telephones such as mobile and smart phones, tablets, and laptop computers, are small, lightweight, and easily carried by users. These devices can communicate voice and data packets over wireless networks. Further, many such devices incorporate additional functionalities such as a digital still camera, a digital video camera, a digital recorder, and an audio file player. Also, such devices can process executable instructions, including software applications, such as a web browser application, that can be used to access the Internet. As such, these devices can include significant computing capabilities.

A wireless device may include a camera that captures image frames (e.g., video and/or image stills). Auto focus accuracy for each image frame captured by the camera may be affected by sensor exposure time and frame time. Sensor exposure time (e.g., a frame integration period) may account for a portion of the frame time. During a frame integration period, pixel data may be generated for each pixel of the frame. Typically, darker frames (e.g., low light frames) have a longer frame integration period. After the frame integration period (e.g., during the remaining portion of the frame time), the lens of the camera is adjusted (e.g., repositioned) to focus on a specific region of interest of the frame.

If the frame integration time period is prolonged, there may be an insufficient amount of time remaining in the frame time to reposition the lens of the camera. For example, if the frame integration time period is approximately equal to the frame time, there may be an insufficient amount of time to reposition the lens of the camera during the remaining frame time after the frame integration time. As a result, a focus value may be collected for the frame while an actuator is moving the lens. As used herein, a "focus value" is an example of one parameter used in passive auto focus that indicates a level of sharpness of a region of interest of a frame. For example, the focus value may be obtained from a statistics engine and may be used in an auto focus algorithm to determine a lens position for improved sharpness.

To generate a reliable focus value, the lens should not move during frame integration. Thus, if the lens is moving during the frame integration period, the focus value may be contaminated (e.g., inaccurate or unreliable). Additionally, if the actuator is moving the lens while the focus value is collected, the focus value will not be representative of an "optimal" lens position for the frame. Thus, image sharpness may be degraded.

IV. SUMMARY

Systems and methods for extending a frame time for image frame processing are disclosed. An image sensor may determine a frame time for processing an image frame. The frame time may include a frame integration period in which pixel data is generated for each pixel of the image frame. A light frame may include a relatively short frame integration period and a dark frame may include a relatively long frame integration period. Because the frame integration period is dependent on external factors (e.g., brightness of the frame), in some circumstances, the frame integration period may account for a relatively large portion of the frame time. As a result, there may be insufficient time remaining in the frame time to reposition the lens of the camera to focus on a region of interest in the image frame.

To address this problem, the image sensor may extend the frame time to create additional time during which an actuator may move the lens of the camera. Thus, the added time may provide the actuator enough time to move the lens to focus on the region of interest in image frame. A "focus value" may correlate (e.g., indicate) a level of sharpness of the region of interest. Extending the frame time may enable the actuator to complete (or substantially complete) oscillation, which may improve the focus value for a given frame.

The amount of time added to the frame time may be based on an amount (e.g., a percentage, a level, a degree, etc.) of permitted focus value contamination during image processing. The focus value contamination may be proportional to an amount of image integration time (e.g., exposure time) per frame during image processing. For example, if the exposure time is short and the actuator does not complete oscillation during the exposure time, the focus value contamination may be relatively high. Alternatively, if the exposure time is long and the actuator completes oscillation during the exposure time, the focus value contamination may be relatively low (or non-existent). When the lens is repositioned to focus on the region of interest, the image processor may collect a more accurate and reliable focus value that is representative of an "optimal" lens position for the region of interest. Thus, the image sharpness of the region of interest in the frame may be improved.

In a particular aspect, a method includes determining, at an image processor, a first time period associated with processing a first frame of an image captured via an image sensor. The method also includes extending a frame time for processing the first frame by a second time period. The second time period is based at least in part on an amount of permitted focus value contamination for processing the first frame, and the frame time includes the first time period and the second time period.

In another particular aspect, an apparatus includes an image processor and a memory storing instructions executable by the image processor to perform operations. The operations include determining a first time period associated with processing a first frame of an image captured via an image sensor. The operations also include extending a frame time for processing the first frame by a second time period. The second time period is based at least in part on an amount of permitted focus value contamination for processing the first frame, and the frame time includes the first time period and the second time period.

In another particular aspect, a non-transitory computer-readable medium includes instructions that, when executed by an image processor, cause the image processor to determine a first time period associated with processing a first frame of an image captured via an image sensor. The instructions are also executable to cause the image processor to extend a frame time for processing the first frame by a second time period. The second time period is based at least in part on an amount of permitted focus value contamination for processing the first frame, and the frame time includes the first time period and the second time period.

In another particular aspect, an apparatus includes means for determining a first time period associated with processing a first frame of an image captured via an image sensor. The apparatus also includes means for extending a frame time for processing the first frame by a second time period. The second time period is based at least in part on an amount of permitted focus value contamination for processing the first frame, and the frame time includes the first time period and the second time period.

Particular advantages provided by at least one of the disclosed aspects include improved focus (e.g., sharpness) of a region of interest in a particular image frame. For example, a frame time may be extended by adding additional time into the frame time. An actuator may use the additional time to move a lens and to focus on the region of interest. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

Figure 3:
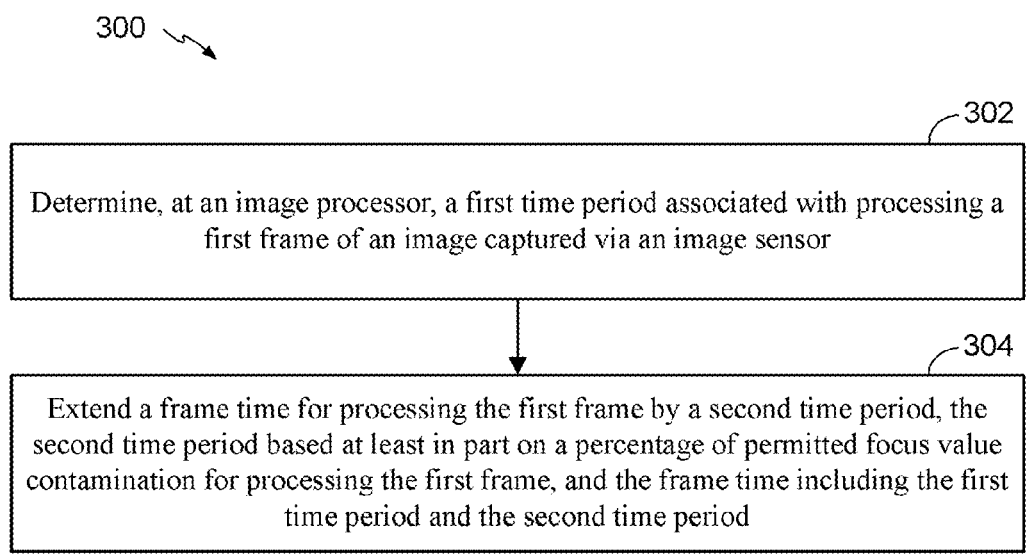
Figure 4:
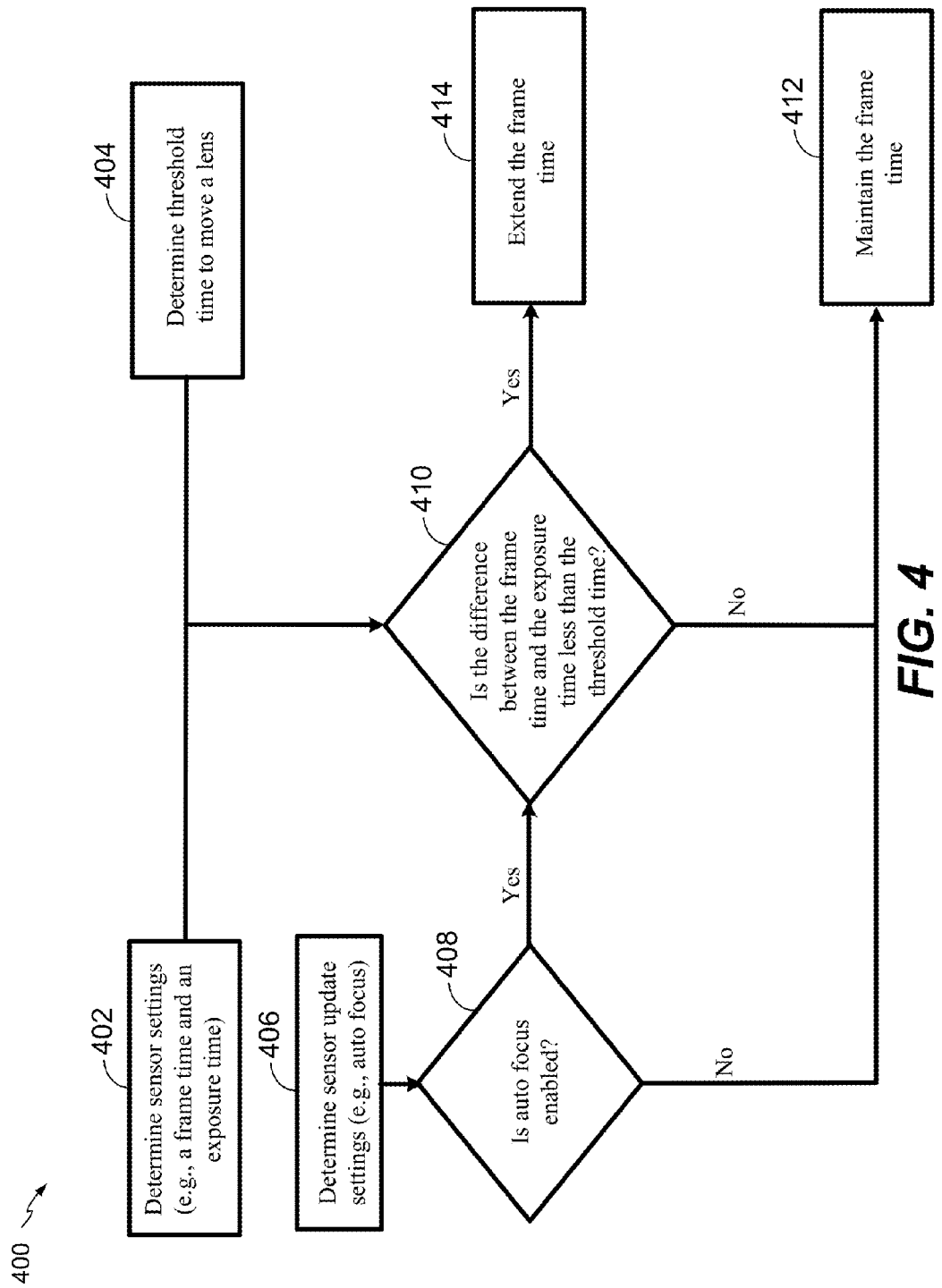
Figure 5:
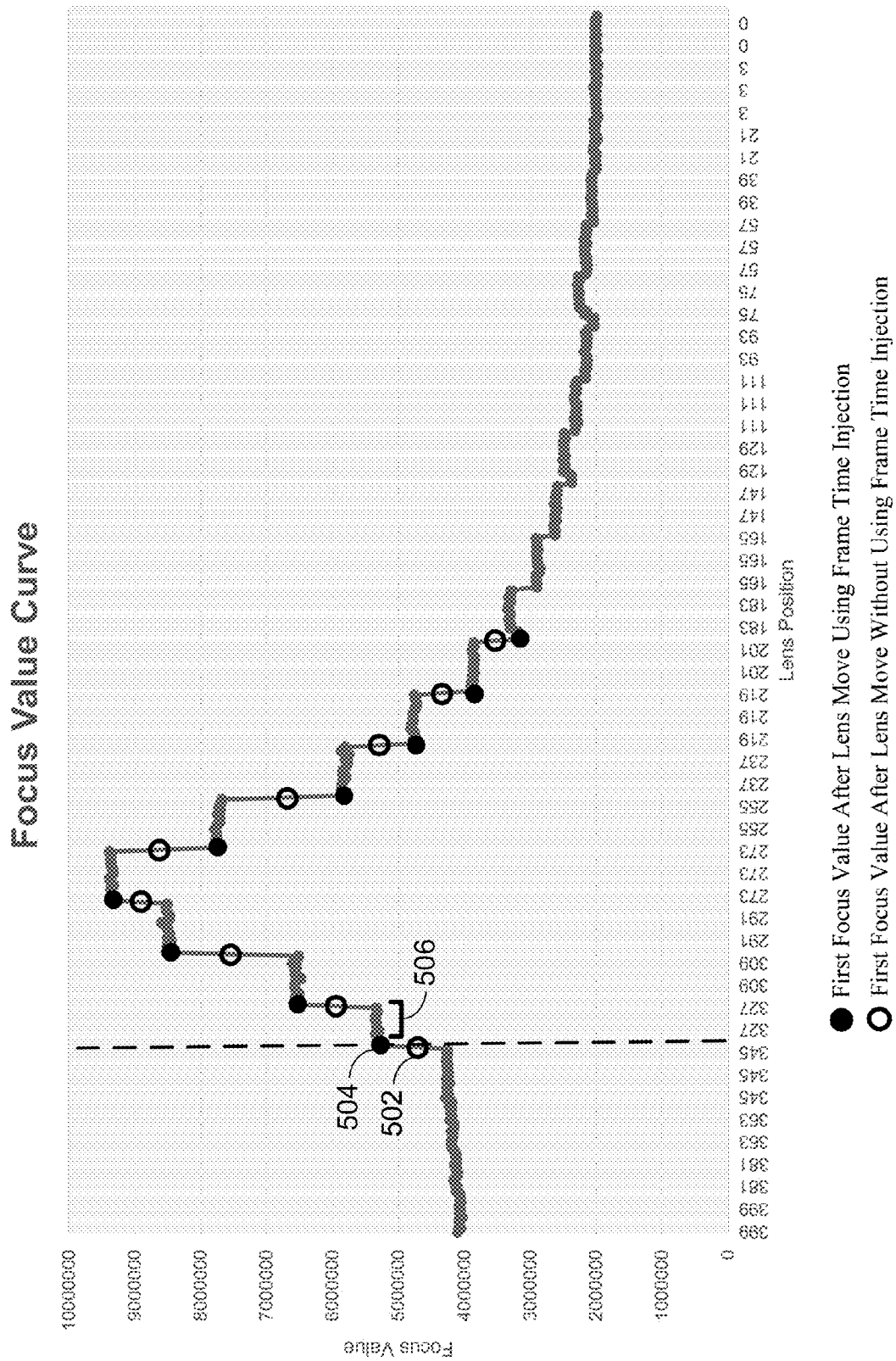
Figure 6:
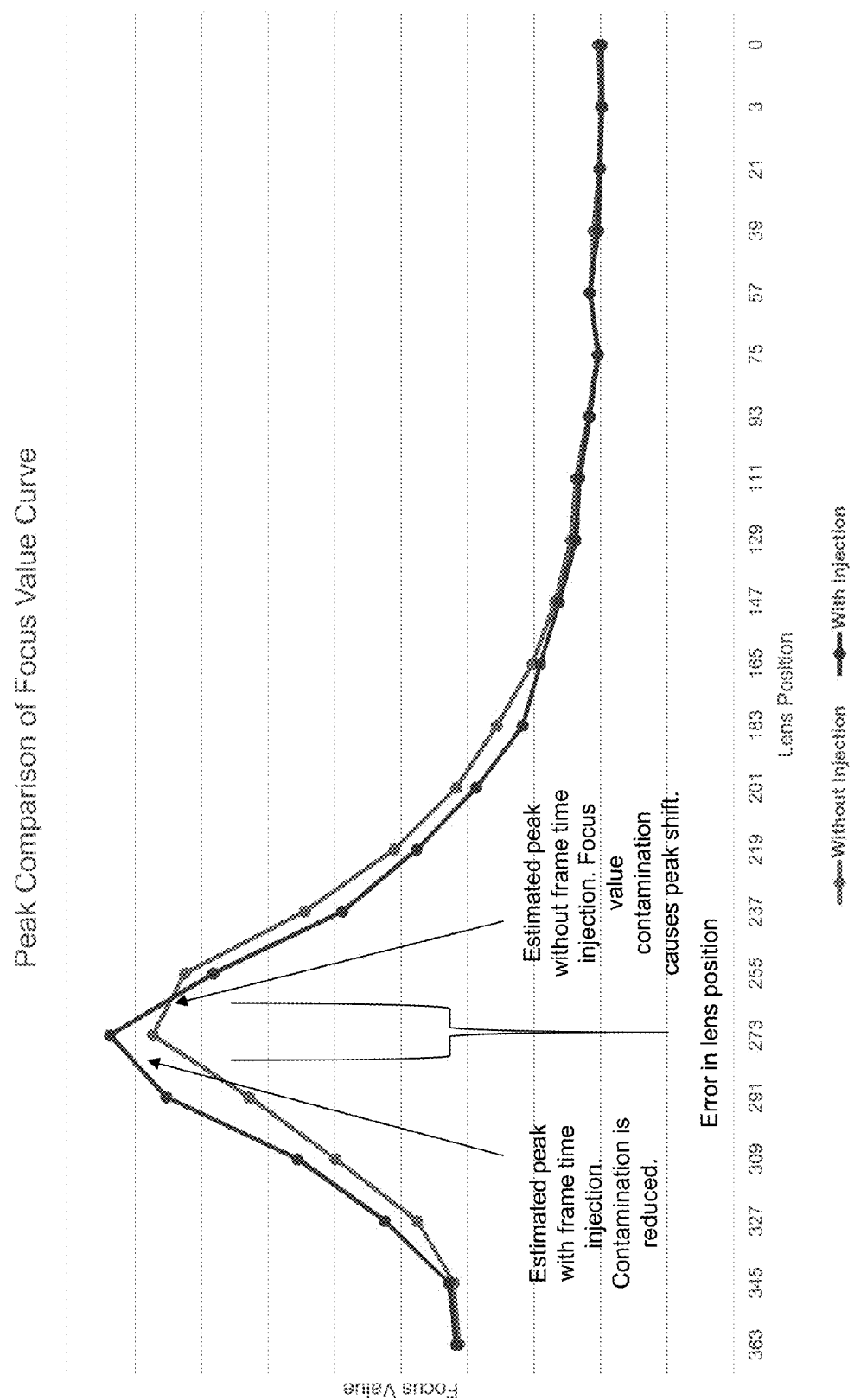
Figure 7:
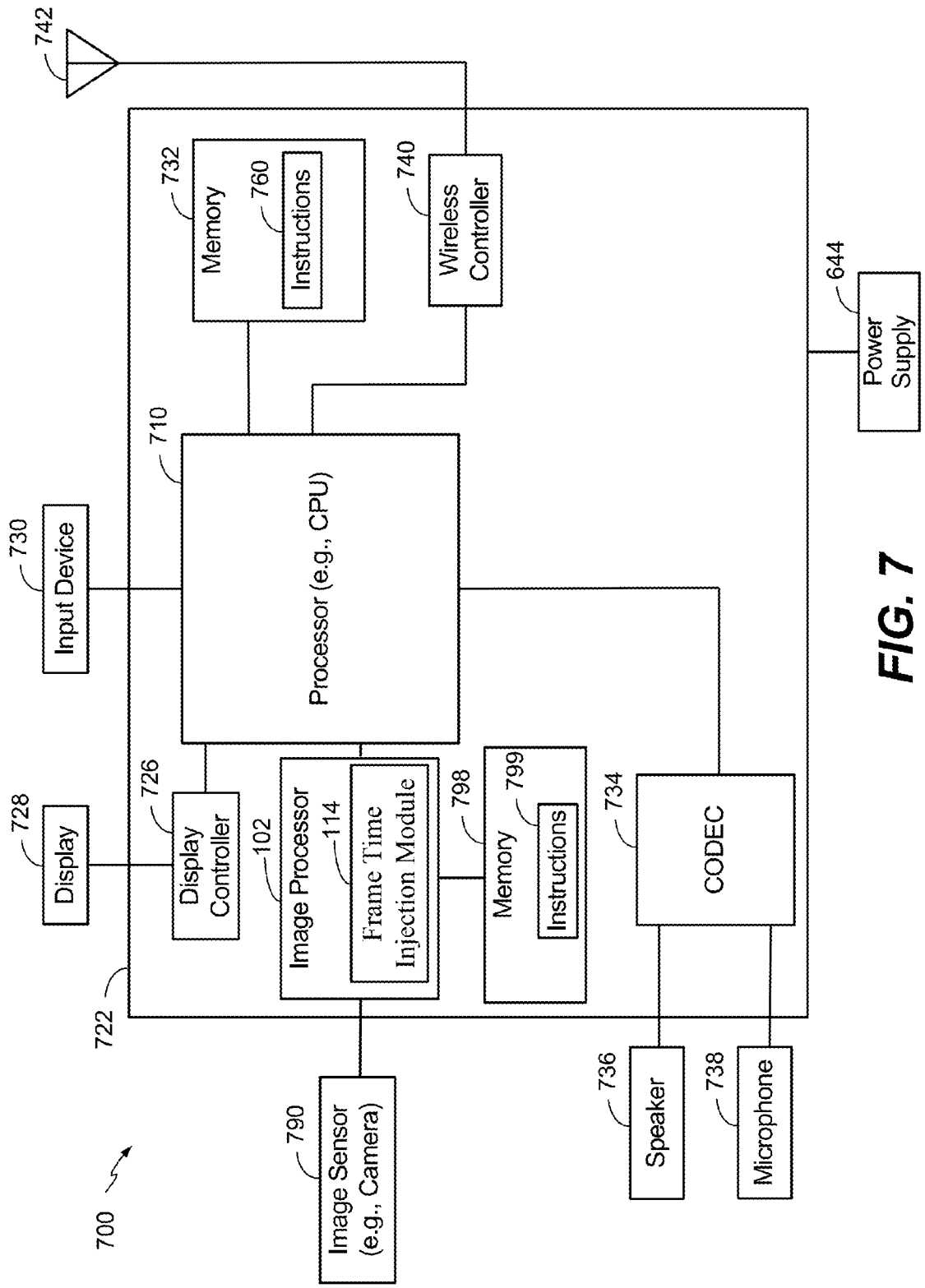

FIG. 3 includes a flowchart to illustrate a particular aspect of a method for extending a frame time for image frame processing;

FIG. 4 includes a flowchart to illustrate another particular aspect of a method for extending a frame time for image frame processing;

FIG. 5 is a diagram of a focus value curve;

FIG. 6 is a peak comparison diagram of the focus value curve of FIG. 5; and FIG. 7 is a block diagram of a wireless device operable to extend a frame time for image frame processing according to the techniques of FIGS. 1-4.

VI. DETAILED DESCRIPTION

Figure 1:
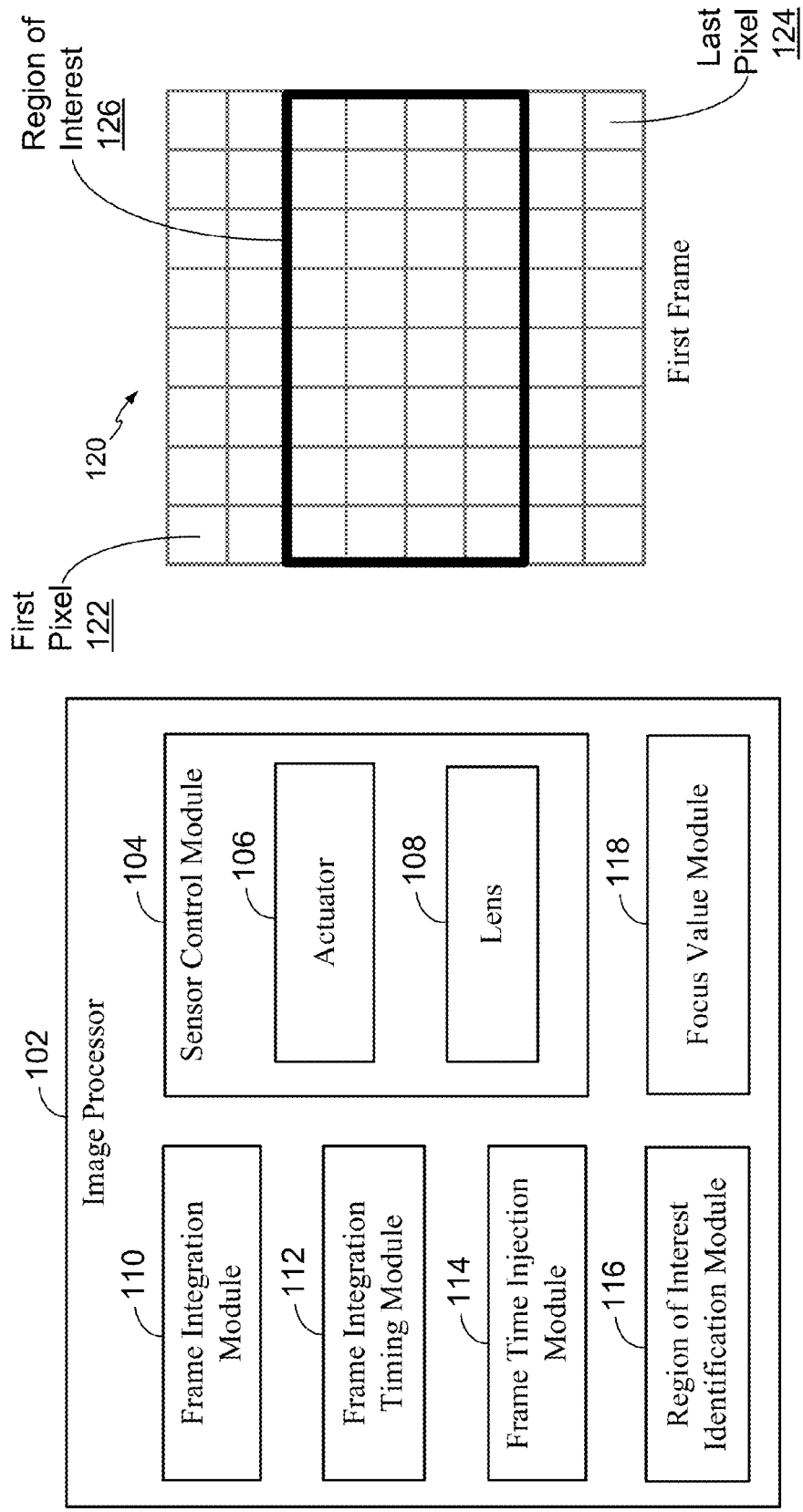
FIG. 1 is a diagram to illustrate a particular aspect of an image processor that is operable to extend a frame time for image frame processing.

Referring to FIG. 1, a particular aspect of an image processor 102 that is operable to extend a frame time for image frame processing is shown. The image processor 102 may include a sensor control module 104, a frame integration module 110, a frame integration timing module 112, a frame time injection module 114, a region of interest identification module 116, and a focus value module 118. In a particular embodiment, the image processor 102 may be included in a wireless device (e.g., a mobile phone).

The sensor control module 104 may be configured to control an actuator 106 and a lens 108 of an image sensor (not shown). For example, the sensor control module 104 may be configured to control movement of the actuator 106, and in turn, the position of the lens 108 may be based on the movement of the actuator 106. For example, the actuator 106 may move the lens 108. As described below, the sharpness of a particular region (e.g., a "region of interest") of an image frame may be based on the position of the lens 108. For example, the region of interest may be more clearly depicted as the position of the lens 108 moves closer to "optimum" focus.

The frame integration module 110 may be configured to "expose" pixels of a frame (e.g., generate pixel data for pixels in a frame). For example, the frame integration module 110 may be configured generate pixel data for each pixel in a first frame 120. The first frame 120 may include a plurality of pixels starting with a first pixel 122 in the top left-hand corner and a last pixel 124 in the bottom right-hand corner. The frame integration module 110 may generate first pixel data for the first pixel 122, generate second pixel data for a second pixel (e.g., the pixel to the right of the first pixel 122), etc. In a particular embodiment, the frame integration module 110 may generate pixel data for each pixel in the top row of pixels and sequentially generate pixel data for each pixel in subsequent rows until pixel data is generated for the last pixel 124. The frame size of the first frame 120 is for illustrative purposes only and is not intended to be limiting. In alternative embodiments, the frame size of the first frame 120 may be different.

The frame integration timing module 112 may determine (e.g., estimate) a frame integration time that represents a length of time (e.g., a length of a "first time period") for the frame integration module 110 to generate pixel data for each pixel in the first frame 120. The determination may be based on a "brightness" level of the first frame 120. For example, if the first frame 120 is relatively bright (e.g., a high light frame), the frame integration time (e.g., "frame exposure" time) may be relatively short. To illustrate, the frame integration time at high light conditions may be approximately 33 ms or less. If the first frame 120 is relatively dark (e.g., a low light frame), the frame integration time may be relatively long. To illustrate, the frame integration time at low light conditions may be approximately 132 ms. Thus, the frame integration timing module 112 may determine the length of time for the frame integration module 110 to generate pixel data for each pixel in the first frame 120 based on the brightness level of the first frame 120.

The frame time injection module 114 may be configured to "add" time (e.g., add a second time period) after the first time period to generate an extended frame time for processing the first frame 120. The determination of whether to add the second time period after the first time period may be based on the first time period (e.g., the exposure time) and an un-extended (e.g., default) frame time. For example, if the difference between the un-extended frame time and the exposure time satisfies (e.g., is greater than) a threshold, the frame time injection module 114 may bypass adding time after the first time period to extend the frame time. If the difference between the un-extended frame time and the exposure time does not satisfy the threshold, the frame time injection module 114 may add the second time period after the first time period to extend the frame time for processing the first frame 120. In a particular embodiment, the frame time injection module 114 may add time (e.g., extend the frame time) on a frame-by-frame basis.

In a particular embodiment, the second time period (e.g., the added time period) may be adjustable on a frame-by-frame basis. For example, the second time period may be based at least in part on an amount of contamination (e.g., a percentage of focus value contamination, a degree of focus value contamination, a level of focus value contamination, etc.) allowed in processing the first frame 120. To illustrate, the second time period (τ) (e.g., the frame injection time) may be expressed as:

$$\tau = \alpha - \epsilon * \rho \quad \text{(Equation 1)}.$$

According to Equation 1, α indicates an amount of time necessary for the actuator 106 to settle (e.g., complete oscillation), ϵ indicates the exposure time, and ρ indicates the amount of contamination allowed. In a particular aspect, the amount of time necessary for the actuator 106 to settle (e.g., "α") may be a fixed time period. As a non-limiting example, the amount of time necessary for the actuator 106 to settle may be approximately 10 ms. The exposure time (ϵ) may vary on a frame-by-frame basis as explained above. The amount of contamination allowed may be based on a customer setting at the image processor 102.

Thus, the second time period (τ) may be adjustable based on the amount of contamination allowed with respect to the exposure time. As an illustrative non-limiting example, the injection time (τ) may be approximately 6.7 ms for a frame having a 33 ms exposure time and having an amount of contamination allowed approximately equal to 10 percent (e.g., 10 ms−(33*0.1)). As another illustrative non-limiting example, the injection time (τ) may be approximately 0 ms for a frame having a 100 ms exposure time and having an amount (e.g., a percentage) of contamination allowed approximately equal to 10 percent (e.g., 10 ms−(100*0.1)).

Thus, the frame time injection module 114 may be configured to extend the frame time for processing the first frame 120 by an adjustable amount according to Equation 1 if the difference between the frame time (without added time) and the exposure time determined by the frame integration timing module 112 does not satisfy the threshold. For example, an auto exposure control (AEC) may set (e.g. configure) the frame time and the exposure time based on a lighting of the first frame. To extend the frame time (e.g., to add time), the AEC may readjust (e.g., reconfigure) the frame time to be longer (based on Equation 1) and maintain the exposure time. During the second time period (τ), the position of the lens 108 may be adjusted to focus on a region of interest 126 of the first frame 120.

To illustrate, the region of interest identification module 116 may identify the region of interest 126 in the first frame 120. For example, the region of interest identification module 116 may identify a "default" region of pixels located in the center of the first frame 120. Alternatively, the region of interest identification module 116 may receive an input tuning preference to identify another region of pixels as the region of interest 126. In the illustrated embodiment, the region of interest 126 corresponds to the pixels in the center of the first frame 120. The actuator 106 may adjust the position of the lens 108 to focus on the region of interest 126 during the second time period (τ).

Repositioning the lens 108 to focus on the region of interest 126 may adjust a focus value of the first frame 120. For example, the focus value module 118 may determine (e.g., collect) the focus value of the first frame 120. In passive auto focus techniques, the focus value may indicate a level of sharpness of the region of interest 126 of the first frame 120. During the second time period (τ) (e.g., the added time), the actuator 106 may reposition the lens 108 such that the focus value module 118 may determine a relatively high focus value.

The image processor 102 of FIG. 1 may improve focus statistics of the region of interest 126 by extending the frame time to enable the actuator 106 to reposition the lens 108. For example, the focus statistics (e.g., the focus value) of the first frame may be substantially similar to focus values of subsequent frames, as further described with respect to FIGS. 5-6. During the added time, the actuator 106 may reposition the lens 108 to focus on the region of the interest 126. Thus, a delay (e.g., the second time period (τ)) may be added to a frame during an auto focus search so that the actuator 106 may reposition the lens 108 to improve focus statistics. In one embodiment, the delay may be added to each frame. In an alternate embodiment, the delay may be added to those frames having a long exposure time. The delay may be substantially less than a delay associated with skipping a frame. For example, skipping a frame may generate an effective delay for the auto focus search that is approximately equal to an additional frame time.

For example, in low light conditions (e.g., 7.5 frames-per-second (FPS)), the frame time may be approximately 132 ms. Skipping a frame after the lens 108 is repositioned may generate an effective frame time of 264 ms (e.g., 2×132 ms); however, if the second time period (τ) according to Equation 1 is approximately 8 ms, adding the second time period (τ) to extend the frame time may generate an effective frame time of 140 ms (e.g., 132 ms+8 ms). As another example, in good lighting conditions (e.g., 30 FPS), the frame time may be approximately 33 ms. Skipping a frame after the lens 108 is repositioned may generate an effective frame time of 66 ms (e.g., 2×33 ms); however, adding the second time period (τ) to extend the frame time may generate an effective frame time of 41 ms (e.g., 33 ms+8 ms). Thus, adding the second period of time to extend the frame time may generate a shorter "effective" frame time compared to skipping a frame, which may provide a greater FPS.

Figure 2:
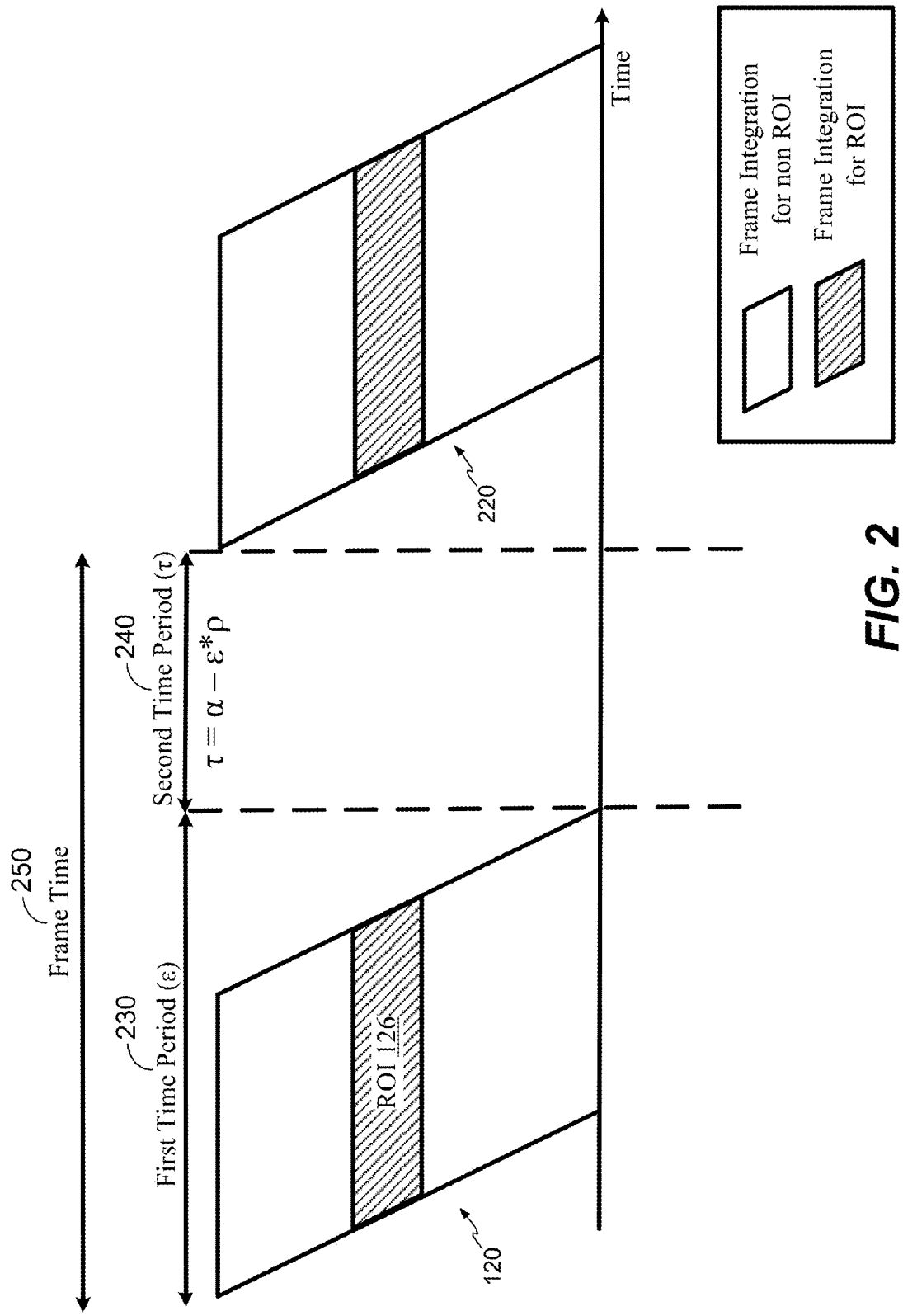
FIG. 2 is a timing diagram illustrating frame time extension for image frame processing.

Referring to FIG. 2, a particular embodiment of a timing diagram illustrating extension of a frame time for image frame processing is shown. The timing diagram illustrates the first frame 120 and a second frame 220 (e.g., a subsequent frame).

During a first time period 230, the first frame 120 may undergo frame integration. The first time period 230 may correspond to the frame exposure time (ϵ) in Equation 1. For example, the frame integration module 110 of FIG. 1 may generate pixel data for each pixel in the first frame 120 during the first time period 230. The white portion of the first frame 120 corresponds to frame integration for pixels that are not in the region of interest 126 (e.g., non-ROI regions), and the striped portion of the first frame 120 corresponds to frame integration for pixels that are in the region of interest 126 (e.g., the ROI). As described with respect to FIG. 1, based on the brightness level of the first frame 120, the frame integration timing module 112 of FIG. 1 may estimate the length (e.g., duration) of the first time period 230.

After the first time period 230, the frame time injection module 114 of FIG. 1 may add a second time period 240 to generate a frame time 250 that includes the first time period 230 and the second time period 240. The second time period 240 may correspond to the second time period (τ) in Equation 1 (e.g., the injection time). For example, the AEC may set (e.g. configure) the frame time 250 and the first time period 230 based on a lighting of the first frame 120. To extend the frame time 250 (e.g., to add the second time period 240), the AEC may readjust (e.g., reconfigure) the frame time 250 to be longer based on the calculations with respect to Equation 1 and maintain the first time period 230 as the exposure time. During the second time period 240, the position of the lens 108 may be adjusted to focus on the region of interest 126 of the first frame 120. For example, the actuator 106 may adjust the position of the lens 108 to focus on the region of interest 126 during the second time period 240. Repositioning the lens 108 to focus on the region of interest 126 may adjust the focus value of the first frame 120. For example, during the second time period 240 (e.g., the added time), the actuator 106 may reposition the lens 108 so that the focus value module 118 of FIG. 1 may determine a relatively high focus value. After the second time period 240 (e.g., after the frame time 250 of the first frame 120), the frame integration module 110 may begin generating pixel data for the second frame 220.

The timing diagram of FIG. 2 illustrates extending the frame time 250 from the first time period 230 to the second time period 240 to provide the actuator 106 with time to reposition the lens 108. For example, adding the second time period 240 after the first time period 230 to extend the frame time 250 may enable the actuator 106 to reposition the lens 108 and focus on the region of the interest 126 without skipping a frame.

Referring to FIG. 3, a flowchart that illustrates a particular aspect of a method 300 for extending a frame time for image frame processing is shown. The method 300 may be performed by the image processor 102 of FIG. 1.

The method 300 includes determining, at an image processor, a first time period associated with processing a first frame of an image captured via an image sensor, at 302. For example, referring to FIGS. 1-2, the frame integration timing module 112 may determine (e.g., estimate) the length of the first time period 230 for the frame integration module 110 to generate pixel data for each pixel in the first frame 120. The determination may be based on a "brightness" level of the first frame 120. For example, if the first frame 120 is relatively bright (e.g., a high light frame), the frame integration time (e.g., "frame exposure" time) may be relatively short. To illustrate, the frame integration time at high light conditions may be approximately 33 ms or less. If the first frame 120 is relatively dark (e.g., a low light frame), the frame integration time may be relatively long. To illustrate, the frame integration time at low light conditions may be approximately 132 ms. Thus, based on the brightness level of the first frame 120, the frame integration timing module 112 may determine (or estimate) the length of time for the frame integration module 110 to generate pixel data for each pixel in the first frame 120.

A frame time for processing the first frame may be extended by a second time period ($\tau$), at 304. For example, referring to FIGS. 1-2, the frame time injection module 114 may add the second time period 240 after the first time period 230 to generate (e.g., extend) the frame time 250 for processing the first frame 120. For example, the image processor 102 may determine the actuator settle time ($\alpha$). The actuator settle time ($\alpha$) may correspond to an amount of time for the actuator 106 to complete oscillation during processing of the first frame 120. In a particular aspect, the actuator settle time ($\alpha$) may be a fixed time period. For example, the actuator settle time ($\alpha$) may be approximately 10 ms. To obtain the second time period 240 (e.g., to determine a length of time to inject), the image processor 102 may subtract a product of the amount (e.g., the percentage) of permitted focus value contamination ($\rho$) and the frame exposure time ($\epsilon$) from the actuator settle time according to Equation 1. The exposure time ($\epsilon$) may be based on lighting conditions associated with the first frame 120, as described above. Thus, the second time period 240 may be based at least in part on an amount of permitted focus value contamination ($\rho$) for processing the first frame 120.

The method 300 of FIG. 3 may improve focus statistics of the region of interest 126 by extending the frame time to enable the actuator 106 to reposition the lens 108. During the added time, the actuator 106 may reposition the lens 108 to focus on the region of the interest 126. Thus, a delay (e.g., the second time period ($\tau$)) may be added to each frame (at the time of processing) during an auto focus search so that the actuator 106 may reposition the lens 108 to improve focus statistics. The delay (e.g., approximately 8 ms) may be substantially less than a delay associated with skipping a frame. For example, skipping a frame may generate an effective delay for the auto focus search that is approximately equal to an additional frame time.

Referring to FIG. 4, another flowchart that illustrates a particular aspect of a method 400 for extending a frame time for image frame processing is shown. The method 400 may be performed by the image processor 102 of FIG. 1.

The method 400 may include determining sensor settings, at 402. For example, referring to FIG. 1, the image processor 102 may determine the frame time for the first frame 120 and the exposure time (e.g., the frame integration time) for the first frame. A threshold time to move the lens 108 may also be determined, at 404. For example, referring to FIG. 1, the image processor 102 may determine (e.g., estimate) a threshold time to enable the actuator 106 to move the lens 108 to focus on the region of interest 126. In a particular embodiment, the threshold time is tunable. For example, in a first scenario, the threshold time may be equal to approximately 4 ms. In a second scenario, the threshold time may be equal to approximately 8 ms. In a particular embodiment, the threshold time may be based on user input. Sensor update settings may also be determined, at 406. The sensor update settings may indicate whether auto focus has been enabled.

If the image processor 102 determines that auto focus has been enabled, at 408, the image processor 102 may determine whether the difference between the frame time and the exposure time is less than the threshold time, at 410. If the difference between the frame time and the exposure time is not less than the threshold time, the image processor 102 may maintain the frame time to process the first frame 120, at 412. For example, the actuator 106 may reposition the lens 108 after the exposure time to improve the focus value of the region of interest 126. If the image processor determines that auto focus has not been enabled, at 408, the image processor may maintain the frame time, at 412, to process the first frame 120.

If the image processor 102 determines that auto focus has been enabled, at 408, and determines that the difference between the frame time and the exposure time is less than the threshold time, at 410, the image processor 414 may extend the frame time, at 414. For example, the frame time injection module 114 of FIG. 1 may add the second time period 240 after the first time period 230 to extend the frame time 250. Adding the second time period 240 may correspond to the AEC extending the frame time 250 while maintaining the exposure time (e.g., the first time period 230). During the second time period 240, the position of the lens 108 may be adjusted to focus on the region of interest 126 of the first frame 120. For example, the actuator 106 may adjust the position of the lens 108 to focus on the region of interest 126 during the second time period 240. Repositioning the lens 108 to focus on the region of interest 126 may adjust the focus value of the first frame 120. For example, during the second time period 240 (e.g., the added time), the actuator 106 may reposition the lens 108 such that the focus value module 118 of FIG. 1 may achieve a relatively high focus value.

The method 400 of FIG. 4 may extend the frame time of a frame so that the actuator 106 has enough time to reposition the lens 108 before the next frame is processed. For example, the actuator 106 may reposition the lens 108 during the extended frame time to focus on the region of the interest 126, and then the image processor 102 may collect the focus value. Thus, a delay (e.g., the extended or "added" frame time) may be added to the frame time during an auto focus search (e.g., during repositioning of the lens 108 to improve focus statistics). The auto focus search may be contrast-based (e.g., based on a comparison of focus values at different lens positions) or may be based on depth estimation. The delay (e.g., approximately 8 ms) may be substantially less than a delay associated with skipping a frame. For example, skipping a frame may generate an effective delay for the auto focus search that is approximately equal to an additional frame time.

Referring to FIG. 5, a particular illustrative embodiment of a focus value curve is shown. The x-axis of the focus value curve indicates a lens position. For example, the x-axis may indicate a position of the lens 108 of FIG. 1. The y-axis of the focus value curve indicates focus values. For example, the y-axis may indicate focus values that are collected (e.g., determined) by the focus value module 118 of FIG. 1.

The open circles may indicate focus values after the lens 108 moves when frame time extension (according to the above-described techniques) is not implemented, and the solid circles may indicate focus values after the lens 108 moves when frame time extension is implemented. For example, when the lens 108 moves to position 327 and frame time extension is not implemented, the focus value (e.g., the open circle) that is collected is approximately 4,500,000, as shown at 502. However, when the lens 108 moves to position 327 and frame time extension is implemented, the focus value (e.g., the solid circle) that is collected is approximately 5,100,000, as shown at 504.

Thus, the focus value (at 502) is substantially different from other focus values (at 506) for the same lens position when frame time extension is not implemented, and the focus value (at 504) is substantially similar to the other focus values (at 506) for the same lens position when frame time extension is implemented. Thus, focus value contamination may be reduced by implementing the frame time extension techniques described with respect to FIGS. 1-4.

Similar results may be achieved for other lens positions illustrated in the focus value curve. For example, similar results may be achieved when the lens 108 moves to position 309, position 291, position 273, position 255, position 237, position 219, position 201, position 183, etc.

Referring to FIG. 6, a peak comparison of the focus value curve of FIG. 5 is shown. The difference between the focus value when frame time extension is implemented at a lens position and the focus value when frame time extension is not implemented at the corresponding lens position represents a peak shift for the lens position.

The difference (e.g., the peak shift) corresponds to an amount of focus value contamination that is reduced by extending the frame time. For example, the focus value when the frame time extension is implemented is a "more stable" focus value (e.g., it is more similar to the other focus values, at 506). Thus, peak shift may be reduced (e.g., focus value contamination may decrease) as the frame time is extended. For example, adding "enough" time to extend the frame time may generate a relatively stable focus value for the frame.

Referring to FIG. 7, a block diagram of a particular illustrative aspect of a wireless communication device is depicted and generally designated 700. The device 700 includes a processor 710 (e.g., a central processing unit (CPU)) coupled to a memory 732. The image processor 102 is coupled to the processor 710.

An image sensor 790 (e.g., a camera) may be coupled to the image processor 102. The image sensor 790 may be configured to capture image frames, and the image processor 102 may be configured to process the captured image frames according to the techniques described with respect to FIGS. 1-4. For example, the frame time injection module 114 of the image processor 102 may extend the frame time for processing a frame, as described above. A memory 798 is coupled to the image processor 102. The memory 798 may be a non-transitory computer-readable medium that includes instructions 799 executable by the image processor 102 to perform the method 300 of FIG. 3 and/or the method 400 of FIG. 4.

The memory 732 may be also non-transitory computer-readable medium that includes instructions 760 executable by the processor 710 or the image processor 102. For example, the processor-executable instructions 710 may cause image processor 102 to perform the method 300 of FIG. 3 and/or the method 400 of FIG. 4. The non-transitory computer-readable medium may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM).

FIG. 7 also shows a display controller 726 that is coupled to the processor 710 and to a display 728. A coder/decoder (CODEC) 734 is coupled to the processor 710. A speaker 736 can be coupled to the CODEC 734, and a microphone 738 can be coupled to the CODEC 734. FIG. 7 also indicates that a wireless controller 740 can be coupled to the processor 710 and to an antenna 742. In a particular aspect, the processor 710, the image processor 102, the display controller 726, the memory 732, the CODEC 734, and the wireless controller 740 are included in a system-in-package or system-on-chip device 722. In a particular aspect, an input device 730, such as a touchscreen and/or keypad, and a power supply 744 are coupled to the system-on-chip device 722. Moreover, in a particular aspect, as illustrated in FIG. 7, the display 728, the input device 730, the speaker 736, the microphone 738, the antenna 742, the power supply 744, and the image sensor 790 are external to the system-on-chip device 722. However, each of the display 728, the input device 730, the speaker 736, the microphone 738, the antenna 742, the power supply 744, and the image sensor 790 can be coupled to a component of the system-on-chip device 722, such as an interface or a controller.

In conjunction with the described aspects, an apparatus includes means for determining a first time period associated with processing a first frame of an image captured via an image sensor. For example, the means for determining the first time period may include the frame integration timing module 112 of FIG. 1, one or more devices (e.g., a processor executing instructions at a non-transitory computer readable storage medium), or any combination thereof.

The apparatus may also include means for extending a frame time for processing the first frame by a second time period. For example, the means for extending the frame time may include the frame time injection module 114 of FIG. 1, one or more devices (e.g., a processor executing instructions at a non-transitory computer readable storage medium), or any combination thereof. The second time period is based at least in part on an amount of permitted focus value contamination for processing the first frame, and the frame time includes the first time period and the second time period.

In conjunction with the described aspects, a second apparatus includes means for determining a frame time allocated for processing a first frame of an image. For example, the means for determining the frame time may include the image processor 102 of FIG. 1, one or more devices (e.g., a processor executing instructions at a non-transitory computer readable storage medium), or any combination thereof.

The second apparatus may also include means for determining an exposure time for the first frame. For example, the means for determining the exposure time may include the frame integration timing module 112 of FIG. 1, one or more devices (e.g., a processor executing instructions at a non-transitory computer readable storage medium), or any combination thereof.

The second apparatus may also include means for determining whether a difference between the frame time and the exposure time satisfies a threshold. For example, the means for determining whether the difference satisfies the threshold may include the image processor 102 of FIG. 1, one or more devices (e.g., a processor executing instructions at a non-transitory computer readable storage medium), or any combination thereof.

The second apparatus may also include means for determining whether to extend the frame time based on the difference. For example, the means for determining whether to extend the frame time may include the frame time injection module 114 of FIG. 1, one or more devices (e.g., a processor executing instructions at a non-transitory computer readable storage medium), or any combination thereof.

Those of skill would further appreciate that the various illustrative logical blocks, configurations, modules, circuits, and algorithm steps described in connection with the aspects disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an ASIC. The ASIC may reside in a computing device or a user terminal. In the alternative, the processor and the storage medium may reside as discrete components in a computing device or a user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method for extending a time period for processing an image frame, the method comprising:
    determining, at an image processor, a first time period associated with processing a first frame of an image captured via an image sensor; and
    extending a frame time for processing the first frame by a second time period, the second time period based at least in part on an amount of permitted focus value contamination for processing the first frame, and the frame time including the first time period and the second time period.

2. The method of claim 1, wherein the first time period corresponds to a frame exposure time, and wherein the second time period is further based on the frame exposure time.

3. The method of claim 2, wherein determining the second time period comprises:
    subtracting a product of the frame exposure time and the amount of permitted focus value contamination from an actuator settle time to obtain the second time period, the actuator settle time corresponding to an amount of time for an actuator to complete oscillation during processing of the first frame.

4. The method of claim 3, wherein the actuator settle time is a fixed time period.

5. The method of claim 3, wherein the actuator settle time is approximately 10 milliseconds.

6. The method of claim 2, wherein the frame exposure time is based on lighting conditions associated with the first frame.

7. The method of claim 1, further comprising generating pixel data for the first frame during the first time period.

8. The method of claim 1, further comprising adjusting a position of a lens of the image sensor during the second time period to adjust a focus value of the first frame.

9. The method of claim 8, wherein the position of the lens is adjusted using an actuator.

10. The method of claim 8, wherein the focus value of the first frame indicates a sharpness of a region of interest of the first frame.

11. An apparatus comprising:
    an image processor; and
    a memory storing instructions executable by the image processor to perform operations comprising:
        determining a first time period associated with processing a first frame of an image captured via an image sensor; and
        extending a frame time for processing the first frame by a second time period, the second time period based at least in part on an amount of permitted focus value contamination for processing the first frame, and the frame time including the first time period and the second time period.

12. The apparatus of claim 11, wherein the first time period corresponds to a frame exposure time, and wherein the second time period is further based on the frame exposure time.

13. The apparatus of claim 12, wherein the operations further comprise:
   subtracting a product of the frame exposure time and the amount of permitted focus value contamination from an actuator settle time to obtain the second time period, the actuator settle time corresponding to an amount of time for an actuator to complete oscillation during processing of the first frame.

14. The apparatus of claim 13, wherein the actuator settle time is a fixed time period.

15. The apparatus of claim 13, wherein the actuator settle time is approximately 10 milliseconds.

16. The apparatus of claim 12, wherein the frame exposure time is based on lighting conditions associated with the first frame.

17. The apparatus of claim 11, wherein the operations further comprise generating pixel data for the first frame during the first time period.

18. The apparatus of claim 11, wherein the operations further comprise adjusting a position of a lens of the image sensor during the second time period to adjust a focus value of the first frame.

19. The apparatus of claim 18, wherein the position of the lens is adjusted using an actuator.

20. The apparatus of claim 18, wherein the focus value of the first frame indicates a sharpness of a region of interest of the first frame.

21. A non-transitory computer-readable medium comprising instructions for extending a time period for processing an image frame, the instructions, when executed by an image processor, cause the image processor to:
   determine a first time period associated with processing a first frame of an image captured via an image sensor; and
   extend a frame time for processing the first frame by a second time period, the second time period based at least in part on an amount of permitted focus value contamination for processing the first frame, and the frame time including the first time period and the second time period.

22. The non-transitory computer-readable medium of claim 21, wherein the first time period corresponds to a frame exposure time, and wherein the second time period is further based on the frame exposure time.

23. The non-transitory computer-readable medium of claim 22, further comprising instructions that, when executed by the image processor, cause the image processor to:
   subtract a product of the frame exposure time and the amount of permitted focus value contamination from an actuator settle time to obtain the second time period, the actuator settle time corresponding to an amount of time for an actuator to complete oscillation during processing of the first frame.

24. The non-transitory computer-readable medium of claim 23, wherein the actuator settle time is a fixed time period.

25. The non-transitory computer-readable medium of claim 23, wherein the actuator settle time is approximately 10 milliseconds.

26. The non-transitory computer-readable medium of claim 22, wherein the frame exposure time is based on lighting conditions associated with the first frame.

27. The non-transitory computer-readable medium of claim 21, further comprising instructions that, when executed by the image processor, cause the image processor to generate pixel data for the first frame during the first time period.

28. An apparatus comprising:
   means for determining a first time period associated with processing a first frame of an image captured via an image sensor; and
   means for extending a frame time for processing the first frame by a second time period, the second time period based at least in part on an amount of permitted focus value contamination for processing the first frame, and the frame time including the first time period and the second time period.

29. The apparatus of claim 28, wherein the first time period corresponds to a frame exposure time, and wherein the second time period is further based on the frame exposure time.

30. The apparatus of claim 29, wherein the frame exposure time is based on lighting conditions associated with the first frame.

* * * * *